United States Patent
Fisher et al.

(10) Patent No.: US 7,929,253 B2
(45) Date of Patent: Apr. 19, 2011

(54) ACTUATOR BEARING HAVING NON-UNIFORM BALL SPACING

(75) Inventors: Freeman Fisher, Charlestown, MA (US); Gerry Woods, Worchester, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 1008 days.

(21) Appl. No.: 11/748,397

(22) Filed: May 14, 2007

(65) Prior Publication Data

US 2007/0268630 A1   Nov. 22, 2007

Related U.S. Application Data

(60) Provisional application No. 60/747,564, filed on May 18, 2006.

(51) Int. Cl.
   *G11B 5/55*   (2006.01)
(52) U.S. Cl. .................................. 360/265.2; 360/265.4

(58) Field of Classification Search ............... 360/265.2, 360/265.4–265.5
See application file for complete search history.

(56) References Cited

U.S. PATENT DOCUMENTS

| 5,483,744 | A | * | 1/1996 | Roberts | 29/898.07 |
|---|---|---|---|---|---|
| 5,510,940 | A | * | 4/1996 | Tacklind et al. | 360/265.6 |
| 5,768,060 | A | * | 6/1998 | Albrecht et al. | 360/265.2 |
| 6,687,092 | B2 | * | 2/2004 | Kan et al. | 360/265.2 |

* cited by examiner

*Primary Examiner* — A. J. Heinz
(74) *Attorney, Agent, or Firm* — McCarthy Law Group (57) ABSTRACT

A method is provided for maintaining the aggregate stiffness of a pivot bearing assembly generally employed along with an actuator assembly of a magnetic disk drive, while increasing the stiffness in a predetermined direction. More specifically, bearing cartridges used in conjunction with actuator assemblies of the prior art employ at least one ball bearing assembly positioned about a stationary shaft. A modification is presented herein that generally concerns repositioning and maintaining the balls of the ball bearing along a predetermined axis for efficient reaction of loads.

20 Claims, 9 Drawing Sheets

(Rotated 90° CCW)

Fig. 4
(Rotated 90° CCW)

ACTUATOR BEARING HAVING NON-UNIFORM BALL SPACING

CROSS-REFERENCE TO RELATED APPLICATIONS

This application claims the benefit of U.S. Provisional Patent Application Ser. No. 60/747,564, filed May 18, 2006, which is incorporated by reference in its entirety herein.

FIELD OF THE INVENTION

The present invention relates to a hard disk drive having improved seek performance. More specifically, the present invention relates to customizing the cartridge assembly stiffness of a disk drive actuator assembly by increasing radial stiffness in at least one direction and decreasing the radial stiffness in a less critical direction.

BACKGROUND OF THE INVENTION

Hard disk drives store information on magnetic disks. Typically, the information is stored on concentric tracks of the disk that are divided into servo sectors and data sectors. Information is written to or read from the disk by a transducer or head, mounted on an actuator arm that positions the transducer over the disk in a predetermined location. Accordingly, the movement of the actuator arm allows the transducer to access the different tracks of the disk. The disk is rotated by a spindle motor at a high speed, allowing the transducer to access different sectors within each track of the disk.

A servo control system is utilized to position the actuator arm. The servo control system, which includes a voice coil motor associated with an actuator assembly, performs the function of seek control and track following. The seek function is initiated when a command is issued to read data from or write data to a target track on the disk. Once the transducer has been positioned sufficiently close to the target track by the seek function of the servo control system, the track following function of the control system centers and maintains the transducer on the target track until the desired data transfer is completed.

Typically, the transducer will oscillate about the centerline of the target track for a period of time following the transition of the servo control system from the seek mode to the track following mode. These off-track displacements, or post-seek oscillations (PSO), are due, at least in part, to mechanical vibrations generated by the components of the disk drive during the seek and/or tracking operation. In addition, while in the track following mode, adjustments to the position of the transducer with respect to the centerline of the target track are often required due to these same or similar mechanical vibrations. Such adjustments are required to correct drift in the position of the transducer relative to the target track. The precise control of the position of the transducer relative to a target track has become increasingly important as track densities (or tracks per radial inch—TPI) in disk drives have increased. More specifically, the number of tracks included on a disk, i.e., the greater the TPI, is proportional to higher data storage capability. However, the increased number of tracks means that there is a more stringent requirement that the transducer stay on track for both reading and writing purposes since the separation distance between adjacent tracks necessarily decreases as TPI increases. A measure of how far the transducer is off target is termed "Track Misregistration" (TMR). It can be measured in distance (e.g., microns) or as a percentage of track pitch. TMR is also referred to as off track or track following errors.

The actuator assembly generally includes one or more actuator arms interconnected to a component commonly known as an "E-block". The E-block also includes an aperture for receiving a shaft and a pivot bearing assembly about which the actuator assembly freely rotates. Each actuator arm includes a load beam with a slider that secures a transducer as previously described. The actuator assembly also includes a yoke that supports a voice coil that is used to position the actuator arms. More specifically, the voice coil is a coil or wire that is selectively supplied current thereby altering its magnetic field. This dynamic field of the voice coil interacts with a static magnetic field of a permanent magnet positioned adjacent to the voice coil. As the two magnetic fields are attracted/repelled, the arm of the actuator assembly will transition over the disk. The magnetic force of the voice coil must be reacted by the shaft and pivot bearing of the actuator assembly. The stiffness of the shaft/bearing directly effects the position of the actuator head and TMR.

The negative effects of post seek oscillations and TMR are most easily described by a brief discussion of track pitch. The distance between two concentric tracks of a disk is known as track pitch, which decreases as TPI increases. For example, a disk with 100,000 TPI has generally a track pitch budget of 0.25 microns (approximately 10 millionths of an inch), wherein a disk with a 150,000 TPI has a track pitch of about 0.17 microns (approximately 7 millionths of an inch). As described above, each vibrating component of a disk drive has a budget that contributes to the maximum allowable TMR that are correctable by the servo control system. That is, vibrational induced oscillations of the transducer must be maintained at or below a level where the servo controller can effectively counteract the movement and control the position of the transducer. This level is predetermined in the design of a disk drive. Returning now to the above example in which TPI is increased from 100,000 to 150,000, and the same servo controller is used in each instance, vibrations generated by the disk drive components increase as a percentage of the total budget. Therefore, it is desirable to implement means of reducing vibrations such as by stiffening the actuator assembly and/or reducing mass or rotating inertia to effectively shift the frequency of the system mode.

As alluded to above, it is often desirable to stiffen the pivot bearing to counteract external loads from the voice coil. The E-block of the actuator assembly is often rotatably interconnected via a plurality of ball bearings to the stationary shaft. The stationary shaft includes a flange at one end for interconnection to the base plate of a disk drive housing. An upper ball bearing assembly and a lower ball bearing assembly are positioned around the external diameter of the shaft. Each ball bearing assembly is comprised of an inner race, which is interconnected to the stationary shaft, and an outer race, which is interconnected to the E-block. The inner and outer races are separated by a plurality of ball bearings. This type of assembly is generally known as a "sleeveless cartridge", other pivot assemblies of the prior art include a cylindrical sleeve positioned exterior to the ball bearings.

Typical ball bearing assemblies are fabricated with the ball bearings evenly spaced about the inner race of the ball bearing assembly. Uniform distribution of balls results in a uniform radial stiffness of the ball bearing assembly, wherein "radial" refers to a direction perpendicular to the axis of the shaft. Traditional ball bearing placement is ideal for applications where the item, i.e. the shaft, is spinning a full 360 degrees. That is, ball bearing assembly employs axially symmetric inner and outer races that are shaped so that a radial load passes through the ball bearing. Most ball bearing assembly designs also support modest axial loads. Ball bearing assemblies also include a cage that is responsible for maintaining ball bearing spacing. Without the cage, the ball bearings would collide and lead to bearing assembly seizure and possibly bearing disassembly. Cages are often comprised of two cage halves made of thin pieces of metal that include indentations for receiving and spacing individual ball bearings. Once the balls are located within the indentations of the cage halves, the cage halves are secured such that the ball bearings remain spaced but are free to rotate.

Actuator assemblies of disk drives only traverse a range of about 20-30 degrees during normal read/write operations. During such rotation, the primary forces acting on the actuator shaft originate from the voice coil and act generally perpendicular, i.e. "lateral", to the axis of the shaft. As used herein, "lateral" generally refers to a direction parallel to the plane of the rotating disk and perpendicular to the axis of the pivot bearing and perpendicular to the longitudinal axis of the actuator assembly. The longitudinal axis of the actuator assembly is defined as a line extending from the voice coil through the center of the pivot bearing to the actuator transducer. Other forces acting on the shaft of the actuator assembly are present, but are small compared to forces acting in the lateral direction. In order to react these lateral and non-lateral forces, it is desirable to stiffen the actuator pivot assembly, which has been done in the past by increasing the preload of the ball bearing assembly. The load of the ball bearing assembly can be generally viewed as tightening the inner race—ball bearing—outer race interconnection, i.e., squeezing the ball bearings. By increasing the preload, the stiffness provided by the ball bearing assembly increases. However, one detrimental effect of increasing preload is that friction of the ball bearing assembly increases which relates to a higher torque load needed to transition the actuator to a desired location on the disk. The torque load is directly proportional to the amount of energy required to operate the disk drive and thus battery life. In addition, by increasing friction in a system, more heat is generated, which is also detrimental to the operation of a disk drive. Higher friction is generally a result of higher pressures or stress levels in the bearings. These higher stress levels lead to a shortened bearing cartridge life. Finally, friction is a non-linear force comprised of static and dynamic components thereby making it difficult to address with the servo control. More specifically, when repositioning a stationary transducer head, more torque is needed to overcome the static friction. This rapid change in loading in magnitude and direction may lead to track overshoots, for example.

SUMMARY OF THE INVENTION

It is desirable in the field of disk drive construction to provide a device and method that increases the stiffness of an actuator pivot assembly without detrimental frictional affects of simply preloading ball bearings that are positioned about the actuator shaft. Embodiments of the invention presented hereinbelow modify ball bearing assembly stiffness by altering bearing placement to increase stiffness in at least one radial direction and to decrease stiffness in less important directions. The stiffness allocation maintains the aggregate radial stiffness of the ball bearing assembly but increases disk drive performance overall.

It is one aspect of the present invention to provide a ball bearing assembly that has an increased actuator bearing stiffness in the lateral direction. The stiffness in the lateral direction is responsible for reacting loads generated by a voice coil motor during repositioning of the actuator assembly as part of the normal operation of a disk drive. One embodiment of the present invention includes ball bearing assemblies having non-uniform or asymmetrical ball bearing placement such that stiffness is increased in the lateral direction and decreased in a longitudinal direction. As briefly mentioned above, the majority of loads acting radially on an actuator pivot assembly are generated by the voice coil motor and act in a direction lateral to the actuator assembly. By shifting some of the ball bearings from the longitudinal side of the ball bearing assembly to the lateral side of the ball bearing assembly, the lateral loads are more effectively reacted. That is, in order to maintain the same number of ball bearings in the ball bearing assembly, a fewer number of balls are situated in a longitudinal direction than in the lateral direction. However, these ball bearings may be omitted entirely rather than attempting to keep the total count the same. This arrangement of ball bearings provides an actuator assembly with an aggregate radial stiffness that is equal to that of a ball bearing assembly with equally spaced ball bearings. Thus embodiments of the present invention are able to maintain the same preload and torque load as ball bearing assemblies that have evenly spaced ball bearings while providing increased stiffness in a more critical direction.

Many advantages can be achieved by repositioning the ball bearings. More specifically, it is contemplated that a disk drive assembly may be fabricated with an actuator pivot assembly having less aggregate stiffness. More specifically, if the traditional ball bearing assembly provides excess radial stiffness in a longitudinal direction, ball bearings situated on the longitudinal side of the ball bearing assembly can be removed thereby decreasing torsional force needed to rotate the bearing assembly which translates into less power consumption and decreased non-linear frictional loads acting on the actuator assembly. The aggregate radial stiffness provided by in the lateral direction of a ball bearing assembly configured in such a way would remain substantially unchanged.

Embodiments of the present invention employ a cage to maintain the asymmetric orientation of multiple ball bearings. Modifications to cages of the prior art may be made or balls removed from ball bearing assemblies commonly used to realize embodiments of the present invention.

Although embodiments contemplated herein are based on ball bearings, one skilled in the art will appreciate that other types of bearings, such as roller, needle, etc., may be employed without departing from the scope of the invention.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-10, a pivot bearing cartridge 2 for an actuator assembly 6 is shown. More specifically, an actuator assembly 6 of a disk drive includes a plurality of actuator arms 10 that are interconnected to a centralized E-block 14. Two members 18 are also included, positioned opposite the actuator arms 10, that provide a location or yoke for interconnection of a voice coil 22. The E-block 14 includes an aperture therethrough for the receipt of a pivot assembly 2 that allows the actuator assembly 6 to freely rotate about a fixed shaft 42 (FIG. 2) when electromagnetic attractive and repulsive forces interact with the voice coil 22. The rotation of the actuator assembly 6 places a transducer or read/write element 26 over preselected areas of a rotating disk to read and/or write data from or to the disk. The read/write element is positioned on a slider 30 which, in turn, is connected to suspension 36 attached to the distal end of the actuator arm 10. Embodiments of the present invention are designed to stiffen the pivot assembly 2 thereby lessening the affect of vibrations and voice coil loads on the transducer head 26.

Figure 1:
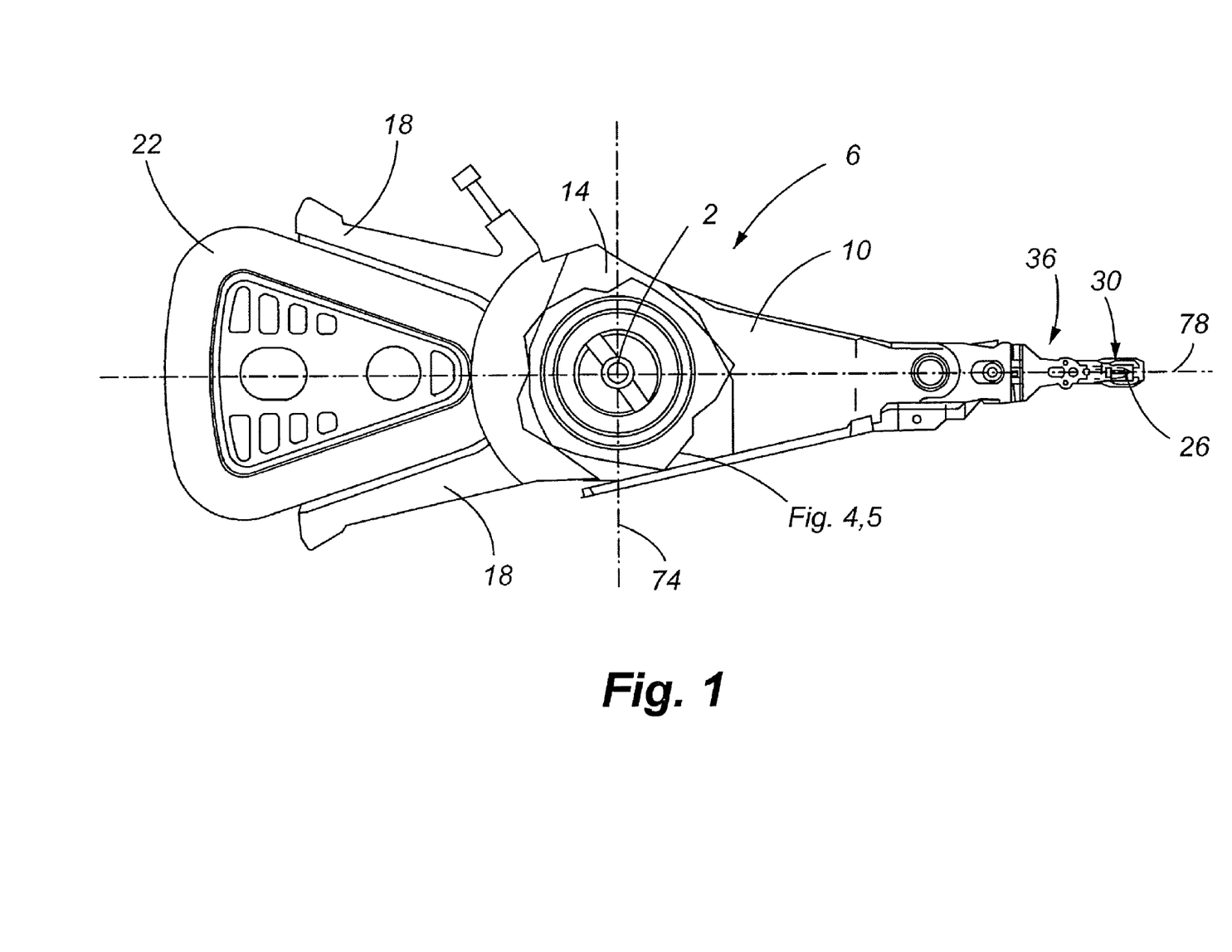
FIG. 1 is a top plan view of an actuator assembly generally employed in a disk drive.
Figure 2:
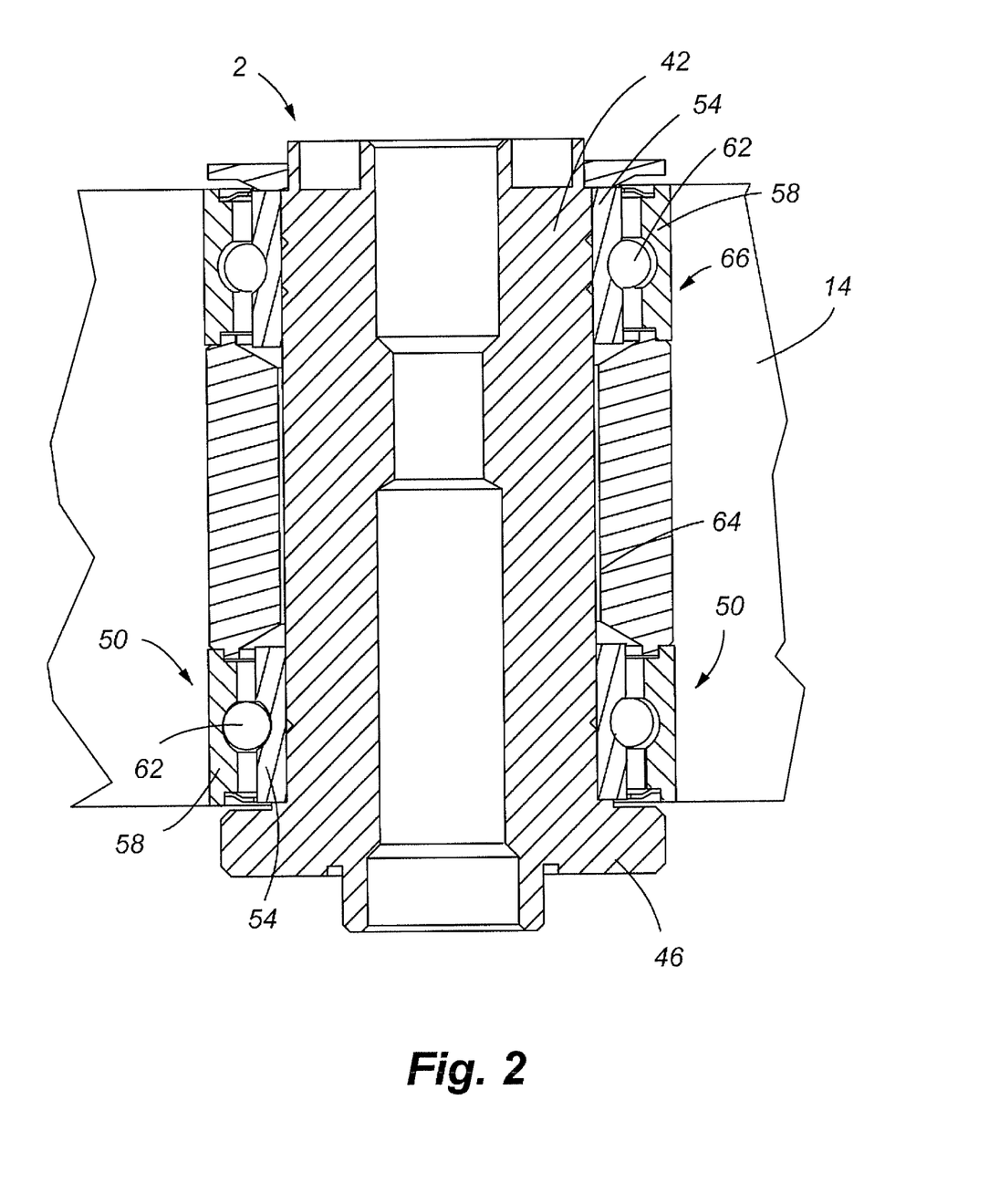
FIG. 2 is a cross-sectional front elevation view of a bearing assembly for rotatable interconnection to an actuator assembly generally employed in a disk drive.

Referring now to FIG. 2, a pivot bearing assembly 2 is shown. More specifically, pivot assemblies 2 include a stationary shaft 42 having a flange 46 for interconnection to the base plate of the disk drive. A lower ball bearing assembly 50, which is comprised of an inner race 54 and outer race 58 in communication via a plurality of ball bearings 62, and an upper ball bearing assembly 66, which is comprised of an inner race 54 in communication via a plurality of ball bearings 62 with an outer race 58, are interconnected to the exterior diameter 64 of the shaft 42. The outer race 58 of the upper ball bearing assembly 66 and the outer race 58 of the lower ball bearing assembly 50 are bonded to the E-block 14 of the actuator assembly and rotate along with the actuator assembly.

Figure 3:
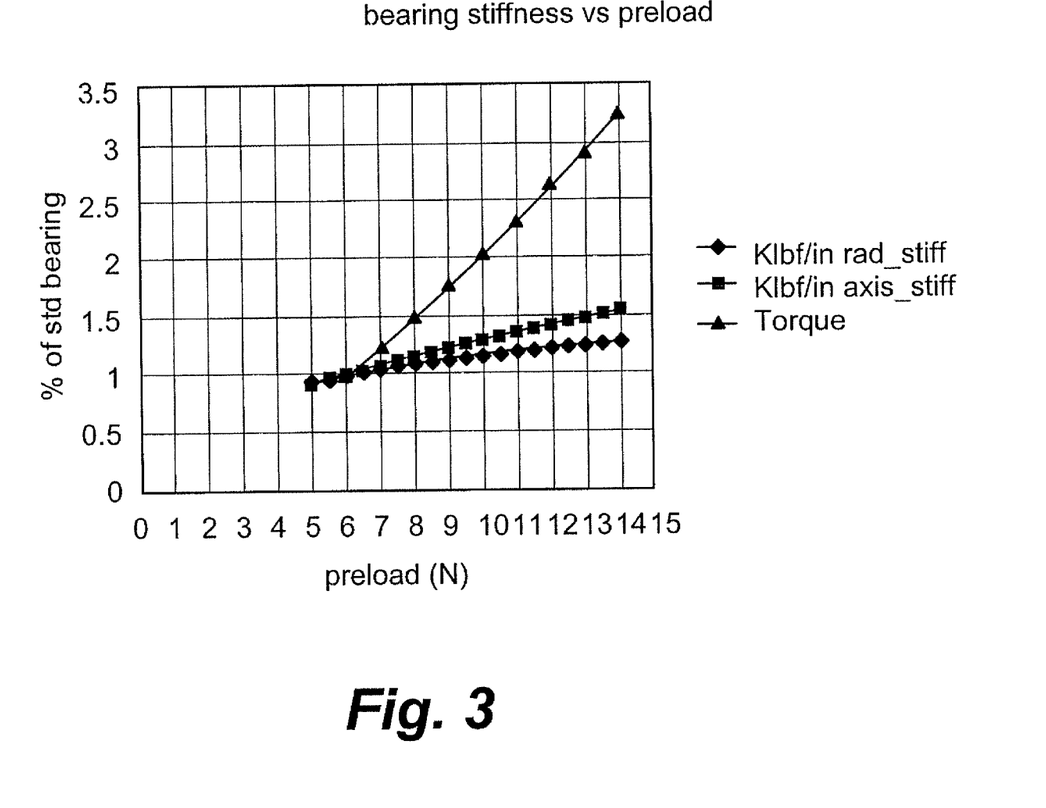
FIG. 3 is a graphical representation of actuator bearing stiffness versus preload.

Referring now to FIG. 3, pivot bearing assembly stiffness normalized to that of a standard ball bearing assembly versus bearing assembly preload is shown. More specifically, by increasing the preload of a ball bearing assembly its radial and axial stiffness will be proportionately increased. As the graph shows, however, a 25% increase in radial stiffness provided by increasing preload will increase bearing assembly friction by approximately three times. In addition, an increase in preload has detrimental effects with respect to non-linear frictional loads that adversely influence the rotation of the actuator assembly and the ability of the servo control to position the transducer head. An actuator assembly at rest will have some static friction or "stiction" prior to being moved. Thereafter, the primary frictional load is dynamic, characterized by the dynamic friction coefficient of a system times the normal load. The normal load is directly related to the preload of the system or squeeze of the races onto the ball bearings. Further, increase in friction has detrimental effects such as increased heat generation and increased power consumption associated with repositioning and rotating the actuator assembly. Thus it is desirable to increase the beneficial radial stiffness of the ball bearing assembly without increasing the preload.

Figure 4:
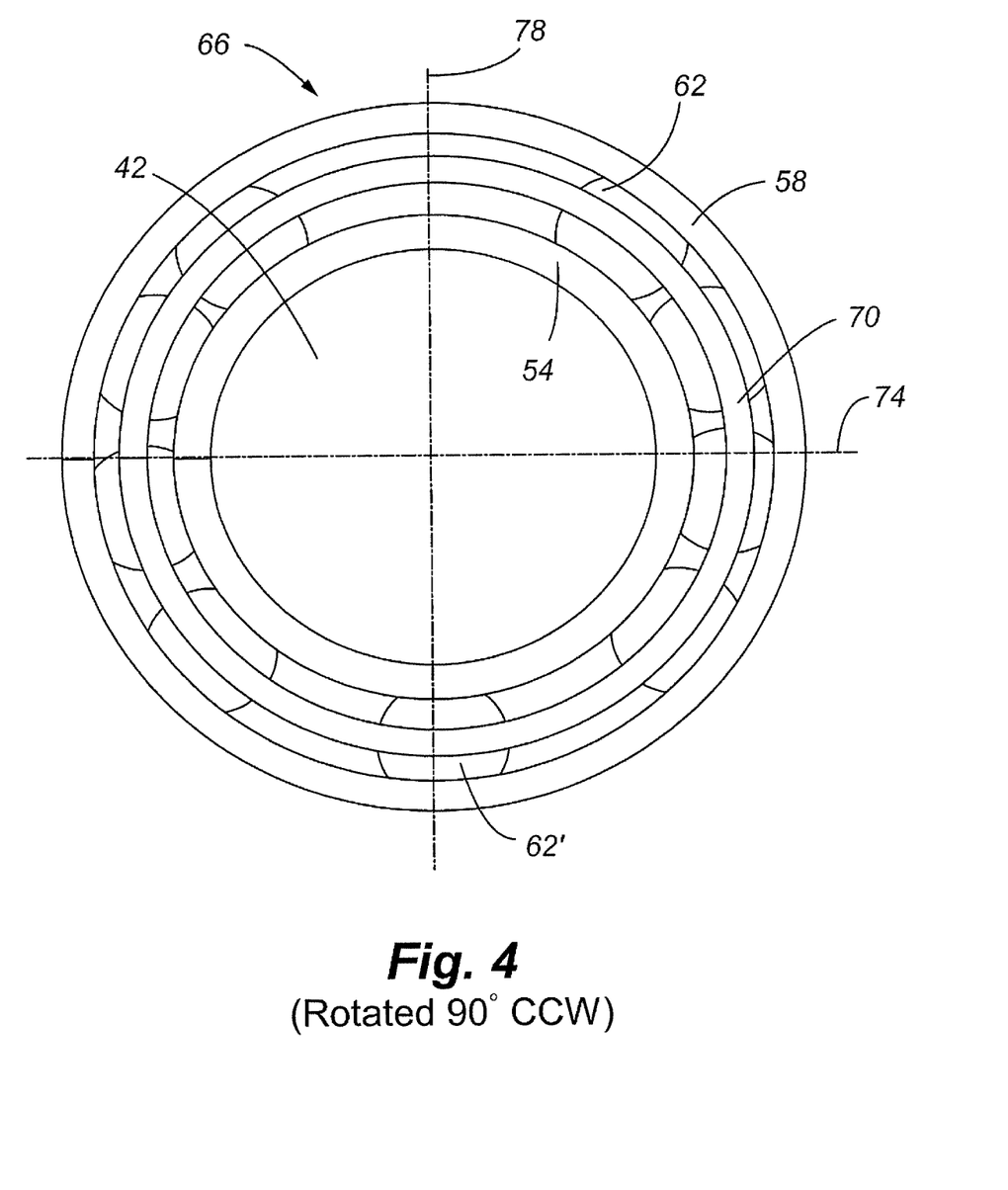
FIG. 4 is a detailed view of the ball bearing assembly of one embodiment of the present invention.

Referring now to FIG. 4, a bearing cage 70 mounted on a shaft 42 is shown. More specifically, the upper ball bearing assembly 66 of one embodiment of the present invention is shown positioned about the shaft 42, other components of the actuator assembly are not shown for clarity. For illustrative purposes only, the lateral direction is represented by axis 74 and the longitudinal direction is represented by axis 78. The plurality of ball bearings 62 are positioned within the inner race 54 and the outer race 58 and are held in a specific spatial orientation by the ball bearing cage 70. The specific orientation of the ball bearings 62 correlate to increased stiffness in a lateral direction 74 to react loads emanating from the voice coil. As a result, stiffness in the longitudinal direction 78 is decreased. The majority of loads acting on the shaft 42 emanate from a direction generally tangential to the spinning disks, i.e. lateral to the actuator assembly in the direction of axis 74. Conversely, minimal loads are preset in a direction longitudinal to the actuator assembly along 78. Thus one embodiment of the present invention reallocates the stiffness provided by the ball bearings 62 in a more desirable direction while maintaining the aggregate stiffness of the ball bearing assembly 66. As it is shown herein, nine ball bearings 62 are provided wherein one ball bearing 62 is positioned along the longitudinal axis 78 of the actuator assembly. This figure is for illustrative purposes and it should be understood that ball bearing assemblies 66 are constructed with any number of ball bearings 62. In the event that an odd number of ball bearings 62 are provided, it can be more beneficial to locate one ball bearing 62' on the longitudinal axis 78 than to further asymmetrically load the bearing assembly along the longitudinal axis 74.

The cage 70, as briefly described above, is a device that maintains ball bearings 62 separation so that they do not seize or group in one location that may cause disassembly or destruction of the ball bearing assembly. Due to the small range of angular rotation of the actuator assembly, the cage 70 as presented herein will generally maintain the ball bearings 62 in the desired location. More specifically, during rotation of the actuator assembly, ball bearings 62 positioning will change, i.e. uniformly clockwise and counterclockwise. However, due to the small rotations of the actuator assembly, the general location of the ball bearings 62 in the ball bearing assembly as contemplated herein will remain generally unchanged.

Figure 5:
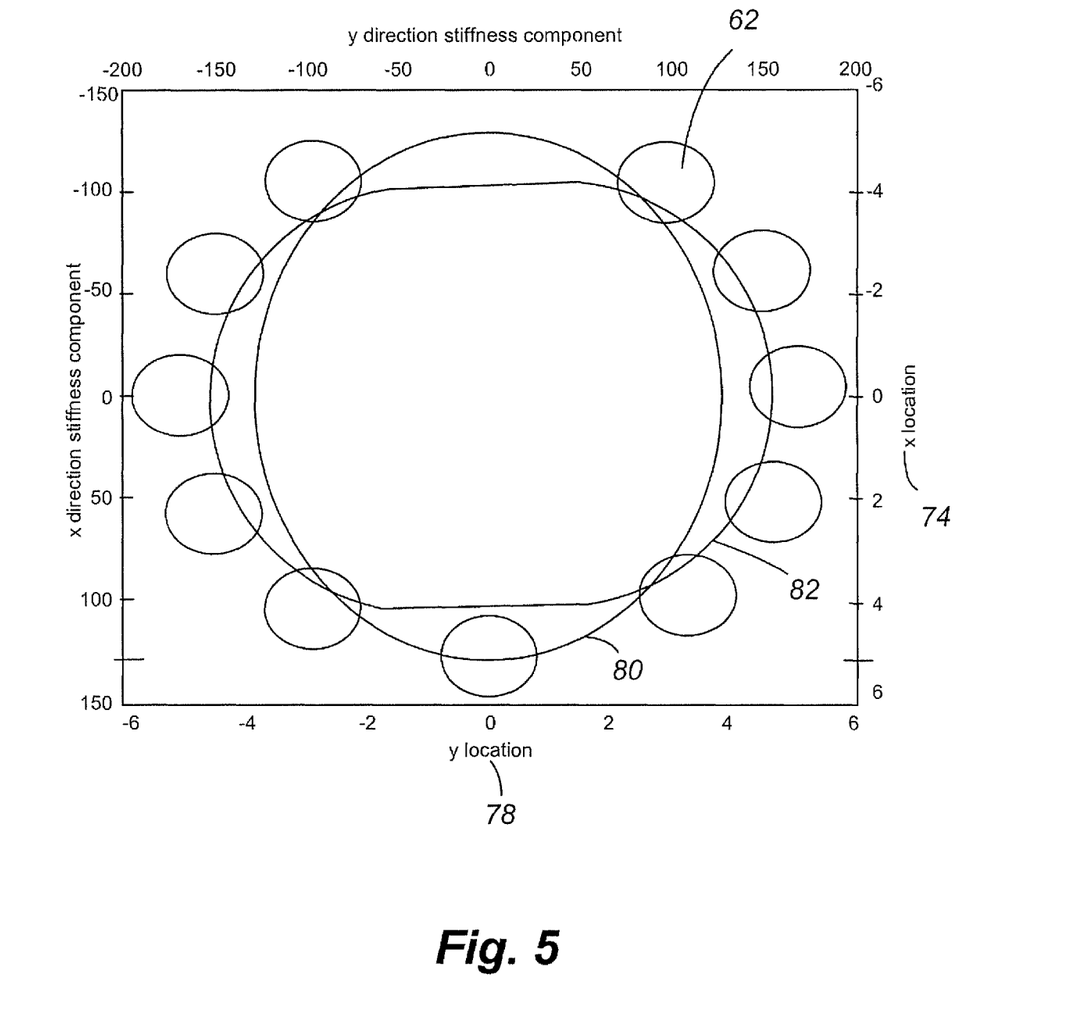
FIG. 5 is a graphical representation of the ball bearing assembly illustrated in FIG. 4.
Figure 6:
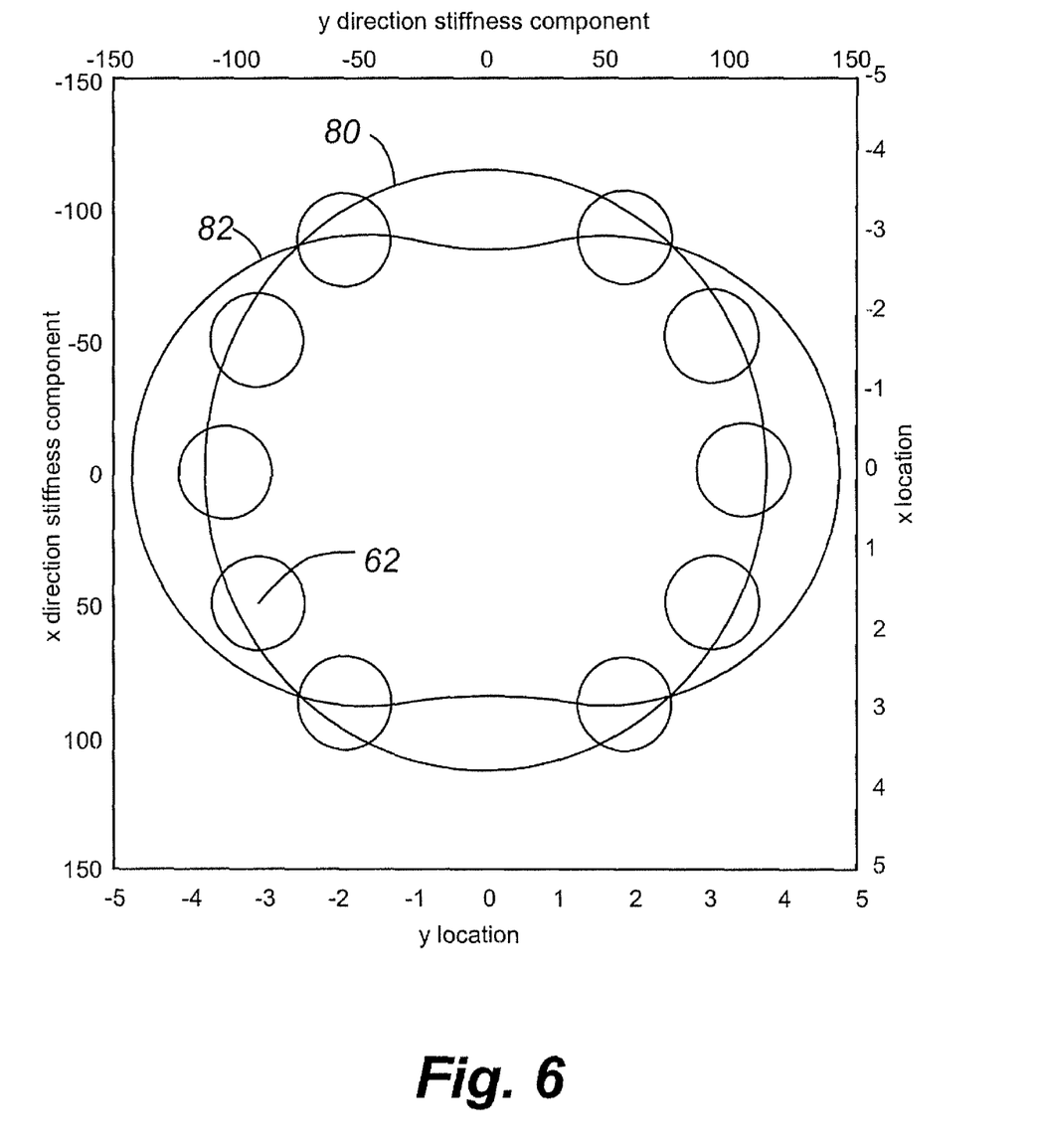
FIG. 6 is a graphical representation of the ball bearing assembly similar to that of FIG. 5, but with ten ball bearings.

Referring now to FIG. 5, graphical representations of the embodiment of the present invention shown in FIG. 4 are shown. In the graph, the reference to "x" location refers to the lateral direction (74 in FIG. 4) and the reference to the "y" location refers to the longitudinal direction (78 in FIG. 4). The "z" direction would be orthogonal to both "x" and "y" into and out of the plane of the graph. Further, the circular trace 80 relates to the prior art ball bearing assembly wherein the ball bearings 62 are positioned uniformly about the inner race of a ball bearing assembly, thereby providing uniform radial stiffness. The oblong trace 82 relates to embodiments of the present invention that positions ball bearings 62 asymmetrically thereby increasing stiffness in the lateral direction while decreasing stiffness in the longitudinal direction where it is less needed. FIG. 6 is similar to FIG. 5 with the exception that ten ball bearings 62 are employed.

Referring now to FIGS. 7A-7D a simplified representation of the actuator assembly 10 is shown. Superimposed on the actuator assembly representations is an oblong stiffness trace 82 similar to that shown in FIG. 5. Again, the stiffness provided by the ball bearing assembly of one embodiment of the present invention is greater in the lateral direction 74 than it is in the longitudinal direction 78. Let's assume for example that the stiffness in the lateral direction 74 is a constant $C_1$ and the stiffness in the longitudinal direction 78 is a constant $C_2$, wherein $C_1 > C_2$. As the actuator assembly 10 rotates, plus 15 degrees (FIG. 7C) or minus 15 degrees (FIG. 7B) from the center orientation (FIG. 7A) the stiffness provided by the ball bearing assembly also rotates relative to the global lateral direction (X) and the global longitudinal direction (Y) of the disk drive (the Z direction being parallel to the axis of the pivot bearing assembly 2). For example, consider a ball bearing assembly with two ball bearings, each positioned along the lateral axis 74 of the actuator assembly 10. This configuration would provide a lateral stiffness of some constant $C_1$ and a longitudinal stiffness of 0 (i.e., for ease of this example it is assumed that no longitudinal stiffness provided by the ball bearings, $C_2=0$). As the actuator assembly 10 rotates a negative 15 degrees (FIG. 7B) the stiffness provided in the lateral direction 74 would be $C_1$ and the stiffness in the longitudinal direction 78 would be 0. However, the stiffness provided in the X direction would be $0.96 C_1$ and the stiffness in the Y direction would be $0.26 C_1$. Accordingly, it also follows that when the actuator assembly is rotated 15 degrees (FIG. 7C) the stiffness provided in the X direction is $0.96\_C_1$ and the stiffness in the Y direction is $0.26 C_1$. Thus, looking at the system globally, with respect to stiffness about the actuator assembly shaft, the stiffness provided in the X direction is greater than or equal to $0.96\_C_1$ and less than or equal to $C_1$ and the stiffness in the Y direction is less than or equal to $0.26\_C_1$ and greater than or equal to 0. That is, globally, the stiffness of the actuator assembly is a function of location about the circumference of the actuator assembly shaft 2 and rotation angle of the actuator assembly 10.

Figures 7A, 7B, 7D:
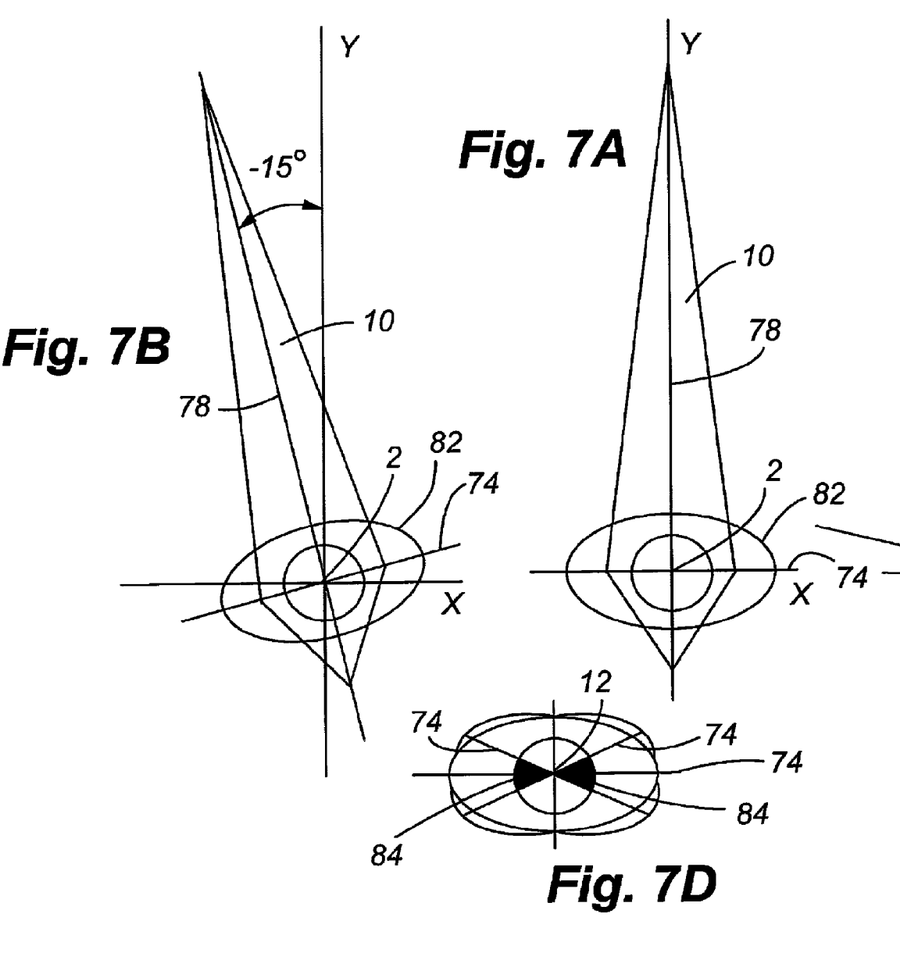
FIG. 7A is a top plan view of a simplified representation of an actuator assembly.
FIG. 7B is a top plan view of a simplified representation of an actuator assembly rotated to the left.
FIG. 7D is a graphical representation similar to that of FIG. 5 that also shows the variation of stiffness as a function of actuator head location.
Figure 7C:
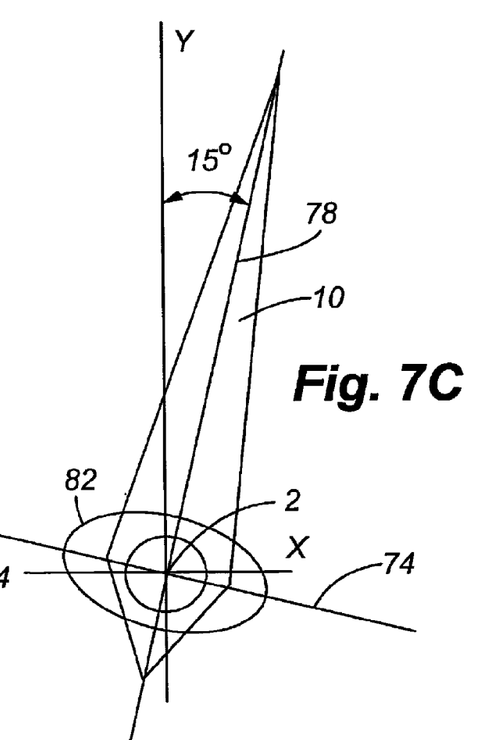
FIG. 7C is a top plan view of a simplified representation of an actuator assembly rotated to the right.

FIG. 7D shows the stiffness traces (FIG. 5) associated with ±15 degrees rotation superimposed thereby defining a stiffened surface on the actuator shaft bearing. When the above example is applied to a ball bearing assembly having a plurality of ball bearings, two opposing portions of the shaft will be provided with greater stiffness. Embodiments of the present invention as contemplated herein will have two circumferentially defined areas of increased stiffness 84. Depending on the placement of the ball bearings, more than two stiffened areas may be associated with the ball bearing assembly.

Figure 8:
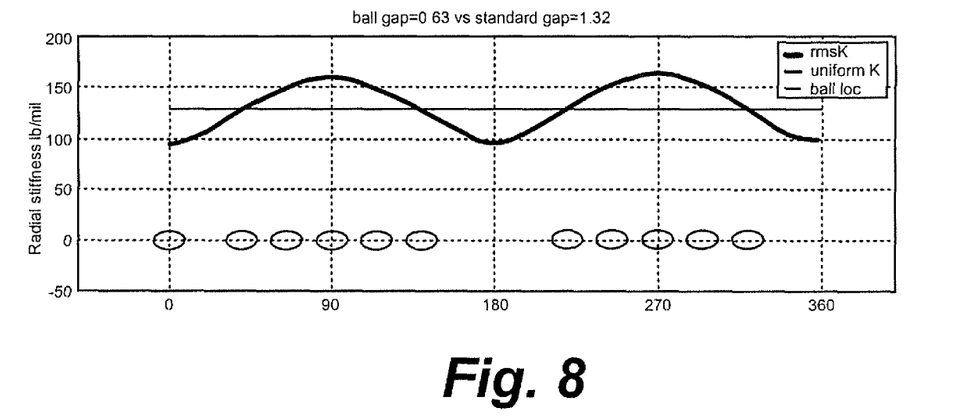
FIG. 8 is a graphical representation of ball bearing placement versus radial shaft stiffness.
Figure 9:
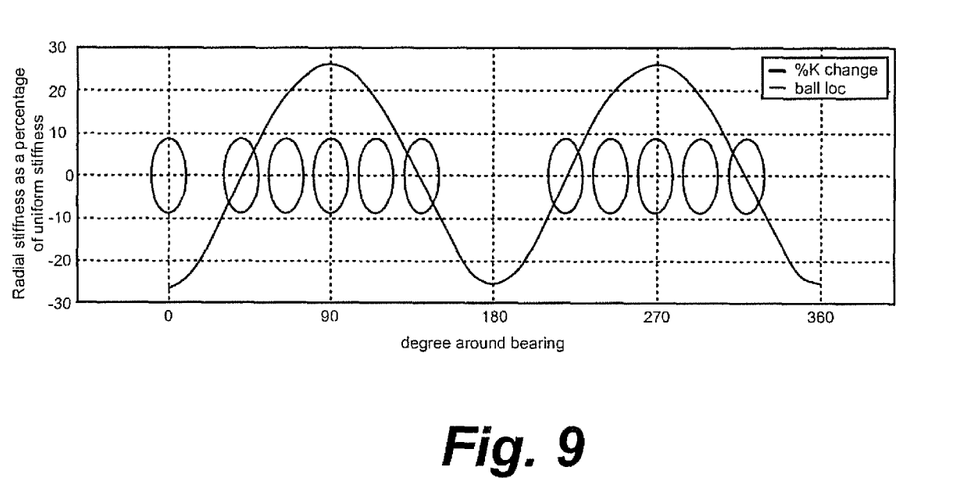
FIG. 9 is a graphical representation of ball bearing placement versus the percentage of stiffness change about the shaft circumference.
Figure 10:
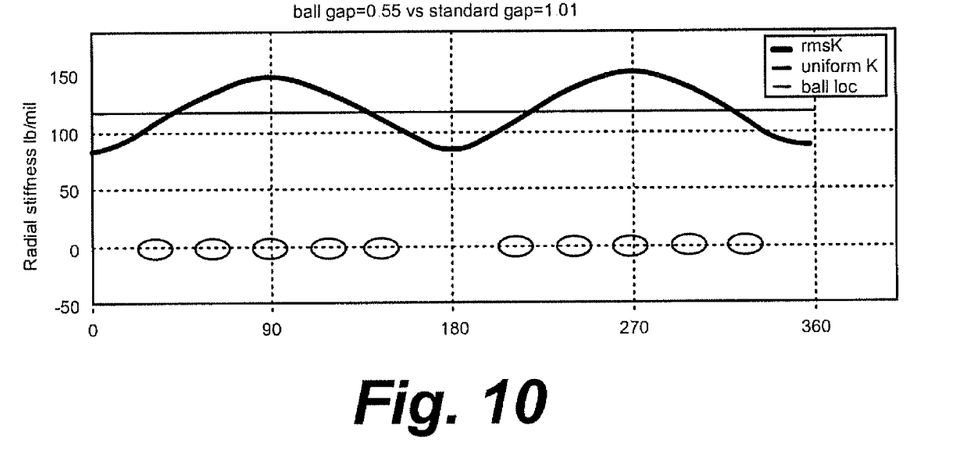
FIG. 10 is a graphical representation of ball bearing placement versus radial shaft stiffness.
Figure 11:
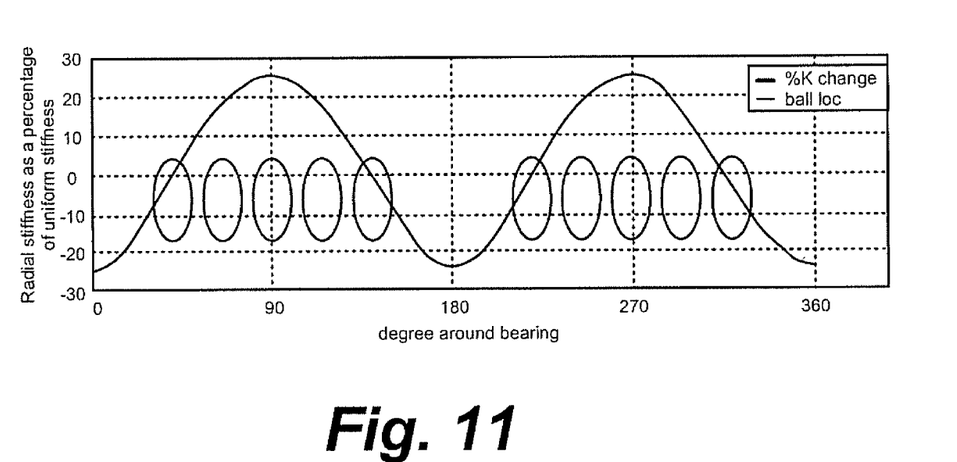
FIG. 11 is a graphical representation of ball bearing placement versus the percentage of stiffness change about the shaft circumference.

Referring now to FIGS. 8-11, graphs showing the influence on stiffness of embodiments of the present invention are presented. More specifically, for a set number of ball bearings, concentrating ball bearings on the lateral side of the actuator assembly pivot shaft increases stiffness in the lateral direction but reduces stiffness in the longitudinal direction. Since the aggregate loading of the ball bearings is not increased, the overall friction of the system does not change. FIGS. 8 & 10 show the change of stiffness as a function of position around the bearing. FIGS. 9 & 11 show the relative percentage change in stiffness. FIG. 9 shows by closing the gap between ball bearings from a standard 1.32 mm to 0.622 mm, an increase in radial stiffness of about 25% is achieved in the lateral direction. FIG. 11 shows by closing the gap between ball bearings from a standard 1.01 mm to 0.55 mm, an increase in radial stiffness of about 25% is achieved in the lateral direction. A comparable stiffness increase using standard uniform ball placement with increased preloading would translate into a torque increase of about 87%. Thus reorientation of ball bearings will accomplish the same aggregate radial stiffness as preloading without any torque penalty.

Current ball bearing assembly processes uses mechanical orientation and optical verification of ball bearing location. Each of these processes could be modified to accommodate an alternative ball placement. Further, a cage design that would maintain the location of the ball bearings is readily envisioned. However, some form of registration to prevent rotation of the cage during operation of the bearing could be a desirable feature. That is, embodiments of the present invention include a feature that prevents cage rotation greater than plus or minus 40° from an axis defined from the center of the actuator pivot assembly to the center of the rotating disk. This feature would be desirable because it would maintain the general orientation of the balls during disk drive fabrication however allowing them to rotate about 20 to 30° during normal operations.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A hard disk drive, comprising:
   a base plate;
   at least one hard disk rotatably interconnected to the base plate;
   an actuator assembly mounted for rotation relative to the at least one hard disk, the actuator assembly comprising at least one actuator arm interconnected to a block, the actuator arm having a distal end with a transducer mounted thereto;
   a stationary shaft mounted to the base plate; and
   a bearing assembly operatively associated with the shaft and the block whereby the block is rotatably interconnected to the shaft, the bearing assembly comprising a plurality of ball bearings interposed between the shaft and the block forming an annular pattern characterized by a first set of two or more ball bearings uniformly spaced apart by a first annular spacing and a second set of ball bearings uniformly spaced apart by the first annular spacing, the first set of ball bearings and the second set of ball bearings being annularly spaced from each other at a second annular spacing that is greater than the first annular spacing.

2. The hard disk drive of claim 1, wherein the first annular spacing is characterized by being decreased about 53% in comparison to the bearing assembly having a uniform spacing between all adjacent ball bearings of the plurality of ball bearings.

3. The hard disk drive of claim 1, wherein the first annular spacing is selected to produce desired post seek oscillations performance of the hard disk drive.

4. The hard disk drive of claim 1, wherein the first annular spacing is selected to produce a desired track misregistration performance of the hard disk drive.

5. The hard disk drive of claim 1, wherein the plurality of ball bearings are separated by a cage.

6. The hard disk drive of claim 1, wherein a longitudinal axis of the actuator assembly is defined by a line that passes through the transducer and the center of the shaft and wherein the plurality of ball bearings comprise a ball bearing positioned on the longitudinal axis.

7. The hard disk drive of claim 6, wherein a lateral axis of the actuator assembly is defined as perpendicular with and co-planar to the longitudinal axis, and wherein the stiffness of the bearing assembly in the lateral direction is increased about 15% to 25% in comparison to a lateral stiffness of the bearing assembly having a uniform spacing between all adjacent ball bearings of the plurality of ball bearings.

8. The hard disk drive of claim 1, wherein the first annular spacing is selected to produce a desired resonance frequency mode of the actuator assembly.

9. The hard disk drive of claim 8, wherein the desired resonance frequency mode is greater in comparison to the bearing assembly having a uniform spacing between all adjacent ball bearings of the plurality of ball bearings.

10. The hard disk drive of claim 1, wherein the first set of ball bearings and the second set of ball bearings are symmetrically positioned on opposite sides of a longitudinal axis.

11. A method for increasing the lateral stiffness of a ball bearing assembly used in connection with an actuator assembly in a hard disk drive, comprising:
   providing a base plate with a stationary shaft mounted thereon;
   mounting an actuator assembly on the shaft for rotation relative to the shaft, the actuator assembly comprising at least one arm interconnected to a block, the arm having a distal end with a transducer interconnected thereto;
   before the mounting step, positioning a bearing assembly between the shaft and the actuator assembly wherein the bearing assembly comprises a plurality of ball bearings forming an annular pattern with a predefined non-uniform spacing defined by a first predefined uniform spacing between adjacent ball bearings of a first portion of the plurality of ball bearings and a different second predefined uniform spacing between adjacent ball bearings of a second portion of the plurality of ball bearings.

12. The method of claim 11, wherein the positioning the bearing assembly step is characterized by the first predefined uniform spacing producing a desired resonance frequency mode of the actuator assembly.

13. The method of claim 11, wherein the positioning step is characterized by the first predefined uniform spacing producing a desired post seek oscillations and track misregistration of the hard disk drive.

14. The method of claim 11, wherein the at least one arm has a longitudinal axis defined by a line that passes through the transducer and the center of the stationary shaft and wherein the positioning step comprises positioning one ball bearing along the longitudinal axis.

15. The method of claim 14, wherein a lateral axis of the actuator assembly is defined as perpendicular to and co-planar with the longitudinal axis, and wherein the predefined non-uniform spacing is characterized by producing a stiffness of the bearing assembly in the lateral direction that is increased about 15% to 25% in comparison to the lateral stiffness of the bearing assembly having a uniform spacing between all adjacent ball bearings of the plurality of ball bearings.

16. A method for making a hard disk drive, comprising:
   obtaining a shaft;
   arranging a ball bearing assembly around the shaft in an annular arrangement so that a first set of ball bearings is uniformly spaced apart at a first annular spacing and a second set of ball bearings is uniformly spaced apart at the first annular spacing, and so that the first set of ball bearings is spaced apart from the second set of ball bearings at a second annular spacing that is greater than the first annular spacing; and
   after the arranging step, interconnecting an actuator assembly to the shaft.

17. The method of claim 16, wherein the arranging step is characterized by decreasing the first annular spacing by about 53% in comparison to the bearing assembly having a uniform spacing between all ball bearings of the plurality of ball bearings.

18. The method of claim 16, wherein the arranging step is characterized by the first annular spacing producing a desired resonance frequency mode of the actuator assembly.

19. In a hard disk drive including an actuator assembly mounted on a stationary shaft, with at least one bearing assembly positioned between the actuator assembly and the shaft, the improvement comprising a plurality of ball bearings around the shaft forming an annular pattern with a predefined non-uniform spacing defined by a first predefined uniform spacing between adjacent ball bearings of a first portion of the plurality of ball bearings and a different second predefined uniform spacing between adjacent ball bearings of a second portion of the plurality of ball bearings.

20. A hard disk drive comprising:
   a base plate;
   a shaft mounted on the base plate;
   an actuator assembly mounted on and rotatable relative to the shaft;
   at least one bearing assembly positioned between the actuator assembly and the shaft; and
   means for increasing the lateral stiffness of the bearing assembly.

* * * * *